(12) United States Patent
Gumm et al.

(10) Patent No.: US 6,307,896 B1
(45) Date of Patent: Oct. 23, 2001

(54) INSTRUMENTATION RECEIVER FOR DIGITALLY MODULATED RADIO FREQUENCY SIGNALS

(75) Inventors: Linley F. Gumm; Jeffrey D. Earls, both of Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/054,976

(22) Filed: Apr. 3, 1998

(51) Int. Cl.[7] ................................................ H03K 9/00
(52) U.S. Cl. ..................... 375/316; 375/327; 375/344; 375/362
(58) Field of Search .................... 375/310, 327, 375/362, 364, 371, 373, 375, 376, 345, 344; 348/536, 537; 455/180.3, 255, 258, 259, 260, 204, 208; 725/73, 111

(56) References Cited

U.S. PATENT DOCUMENTS

| 4,091,410 | 5/1978 | Citta ........................................ 358/24 |
| 4,630,283 | * 12/1986 | Schiff ..................................... 375/143 |
| 4,718,116 | * 1/1988 | Jacobs et al. ........................ 455/234.2 |
| 5,416,524 | 5/1995 | Citta et al. ............................. 348/471 |
| 5,430,890 | * 7/1995 | Vogt et al. .......................... 455/180.3 |
| 5,790,514 | * 8/1998 | Marchok et al. ..................... 370/208 |
| 5,878,087 | * 3/1999 | Ichihara ................................ 375/316 |

OTHER PUBLICATIONS

"VSB Modulation Used for Terrestrial and Cable Broadcasts" Gary Sgrignoli et al Jun. 1995.
"ATSC Digital Television Standard" Sep. 16, 1995, Advanced Television Systems Committee.
"Guide to the Use of the ATSC Digital Television Standard" Oct. 4, 1995, Advanced Television Systems Committee.

* cited by examiner

Primary Examiner—Stephen Chin
Assistant Examiner—Shuwang Liu
(74) Attorney, Agent, or Firm—William K. Bucher; Francis I. Gray (57) ABSTRACT

An instrumentation receiver suitable for receiving a digitally modulated radio frequency input signal having a pilot signal at the RF frequency and symbol data generated at a symbol frequency generates a digitally modulated intermediate frequency signal having the pilot signal at the intermediate frequency equal to an integer multiple of the digital data's symbol frequency where the integer multiple is equal to or greater than one. A reference signal having a frequency equal to an integer multiple of the symbol frequency where the integer multiple is equal to or greater than one mixes with the IF signal to generate a control signal for controlling a local oscillator that generates a local oscillator signal for mixing with the digitally modulated RF input signal for locking the pilot signal to the reference signal. The instrumentation receiver is usable in a measurement test set for characterizing and monitoring an 8-VSB digital television transmitter or other digitally moduated RF signal containing a pilot at the carrier frequency.

12 Claims, 6 Drawing Sheets

INSTRUMENTATION RECEIVER FOR DIGITALLY MODULATED RADIO FREQUENCY SIGNALS

BACKGROUND OF THE INVENTION

The present invention relates generally to instrumentation receivers and more particularly to an instrumentation receiver for measuring the signal quality of digitally modulated radio frequency signals, such as generated in digitally modulated television broadcasting.

The Federal Communications Commission has adopted the Digital television Standard developed by the Advanced Television Systems Committee (ATSC). The Digital Television Standard is designed to transmit high quality video and audio and ancillary data over a 6 MHz channel. The Standard describes the channel coding and modulation RF/transmission subsystems for terrestrial and cable applications. The modulation subsystem uses a digital data stream to modulate the transmitted signal and may be implemented in two modes: a terrestrial broadcast mode (8-VSB) delivering about 19 Mbps, and a higher data rate mode (16-VSB) delivering about 38 Mbps for cable television systems where higher signal to noise ratio is ensured.

The modulation technique implemented in the Digital Television Standard employs vestigial sideband modulation that was developed by Zenith, Electronics Corp. The overall system response of the combined transmitter and receiver utilizes a raised cosine filter to eliminate inter-symbol interference. The system response is implemented with identical root raised cosine filters in the transmitter and in the receiver. The incoming digital data stream is randomized, forward error corrected (FEC) and interleaved. The randomized, FEC coded and interleaved data is trellis encoded as an 8-level (3-bit) one dimensional constellation. The outputs of the trellis coder are referred to as symbols that are one of eight discrete odd integers levels from −7 to +7 set by the encoder. To aid synchronization in low signal to noise and/or high multipath situations, segment and field syncs are added to the 10.76 Msymbols/sec signal as well as a small pilot tone at the carrier frequency generated by offsetting the real or I-channel of the composite signal containing the data and the sync pulses by 1.25 units. At the transmitter, the composite signal passes through a root raised cosine filter and modulates an intermediate frequency carrier signal which is up-converted to an RF frequency for transmission at the desired channel frequency. The offset causes the pilot tone to be in-phase with the I-channel carrier frequency. Alternately, the composite signal may directly modulate the RF carrier.

Figure 1:
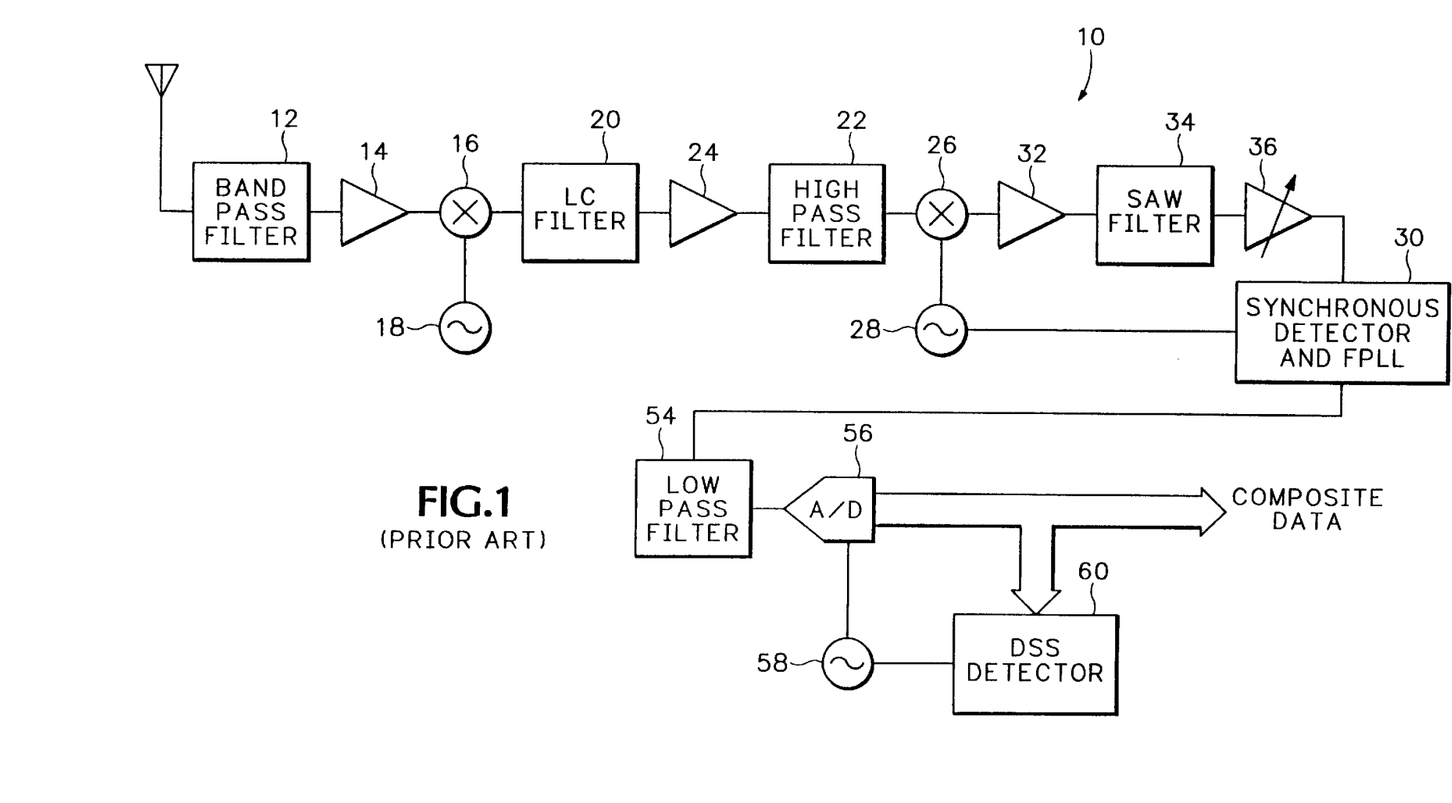
FIG. 1 is a block diagram of a prior art digital television receiver for receiving an 8-VSB digital television signal.

Referring to FIG. 1, there is shown a representative block diagram of a VSB receiver for extracting the digital television signal data from the digitally modulated RF signal as described in the "Guide to the Use of the ATSC Digital Television Standard" published by the ATSC. The receiver 10 receives the UHF or VHF signal through a band-pass and broadband tracking filter 12. A wideband amplifier 14 increases the signal and couples it to a first mixer 16. The mixer is driven by a 1st local oscillator 18 that tunes over a range from 978 to 1723 MHz. The 1st local oscillator 18 is synthesized by a phase locked-loop and controlled by a microprocessor (not shown). The output of the mixer 16 is an up-converted intermediate frequency (IF) signal at 920 MHz. The IF signal is coupled to an LC filter 20 in tandem with a band-pass ceramic resonator filter 22 centered at 921 MHz. An IF amplifier 24 is placed between the two filters. The IF signal is coupled to a second mixer 26 that is driven by a 2nd local oscillator 28. The 2nd local oscillator 28 is an 876 MHZ voltage controlled SAW oscillator controlled by a frequency and phase-locked loop (FPLL) synchronous detector 30. The output of the second mixer 26 is centered at 45 MHz. This IF signal drives a constant gain MHZ amplifier 32. The output of the amplifier 32 is coupled to an IF SAW filter 34. The IF SAW filter 34 implements an approximation of the matched root raised cosine filter at the receiver. The output of the SAW filter 34 is coupled to the FPLL synchronous detection circuitry 30 via an AGC controlled amplifier 36.

Carrier recovery is performed on the pilot signal by the FPLL synchronous detector circuit 30. The operation of this circuit is described in U.S. Pat. No. 4,091,410, assigned to Zenith, Electronic Corp. The configuration provides a Phase Locked Loop (PLL) function with a very wide pull-in range which insures rapid carrier acquisition. The I-channel composite baseband data signal from the FPLL synchronous detector 30 is coupled through a low pass filter 54 to an analog-to-digital converter (A/D) 56 that is clocked by a properly phased 10.76 MHz symbol clock 58. The digital data from the A/D converter 56 is coupled to a data segment sync detector 60 having a narrow bandwidth filter for detecting from the synchronously detected random data the repetitive data segment syncs as described in U.S. Pat. No 5,416,524, assigned to Zenith, Electronic Corp. A control voltage error signal from the data segment sync detector 60 locks the symbol clock to the incoming data clock frequency.

As television broadcasters convert to digital transmission, precision test equipment to monitor transmitter performance will be needed. In analog broadcast, attention to the quality of the transmitted signal is driven primarily by the pride of the operator and somewhat by competitive pressures. The result of a poor quality transmitted signal is a degraded but still viewable picture at the receiver. In digital broadcasting, any artifacts inserted into the signal by the transmitter are interpreted by the receiver as noise. It appears that when the transmitter's signal to noise ratio falls below 27 dB, there will be a noticeable loss of coverage area as the transmitter's errors combine with normal environmental noise to drive receivers below the threshold of reception in fringe areas located well away from the transmitter. Threshold is an effect where the forward error correction in the digital television receiver successfully corrects errors in the digital television signal down to a point where an increase in the noise level or decrease of the signal level will swamp the forward error correction circuitry with the result of total picture loss. This is called the "cliff effect". Decreasing the signal to noise ratio of an analog NTSC signal results in increasing poor picture quality whereas decreasing the signal to noise ratio results in no loss of picture quality until the cliff effect kicks in and the picture is lost. Therefore, in digital broadcasting, loss of coverage is a direct economic consequence of poor transmitter signal quality. A strong emphasis on measuring and maintaining the digital television transmitter at optimum levels is to be expected.

There are a number of drawbacks to the above described VSB digital television receiver that makes it unsuitable for making precise digital television transmitter measurements. Extensive filtering of the digital signal in the receiver masks transmitter generated phase and magnitude variations and phase noise that may be present resulting in inaccurate transmitter measurements. Further, mixing the digital signal down to baseband in the receiver's final stages introduces spurious responses, such as intermodulation products and DC offset, in the output of the A/D conversion. The DC offset may be caused by the pilot signal in the digital signal or by the receiver itself with no way of distinguishing the difference between the two. Additionally, it is more difficult to hold the extreme flatness and envelope delay specifications when converting to baseboard band. Also, if only the I-channel is converted to baseband, there is a modest amount of spectral folding and aliasing that increases measurement error.

A Hewlett-Packard HP 89440A Vector Signal Analyzer has been used for making measurements on 8-VSB signals. The HP 89440A includes a superheterodyne receiver having a first LO and mixer for up-converting the incoming signal to a first IF frequency. Second and third LOs and mixers respectively generate second and third IF frequencies of 40 MHz and 10 MHz. The 10 MHz IF is digitized by an analog-to-digital converter with the digitized data being down converted to baseband real and imaginary data. The real and imaginary data values are passed to a digital signal processor for FFT conversion and additional signal processing. A limitation of the superheterodyne type receiver is the need for bandwidth limiting filters between the IF stages to prevent the undesired mixer signal outputs from entering subsequent IF stages. Such filtering can mask artifacts in the transmitter signal resulting in inaccurate measurements of the operating condition.

What is needed is an instrumentation receiver for digitally modulated radio frequency (RF) signals, such as VSB digital television signals, that accurately converts the incoming signal to an intermediate frequency (IF) signal without masking artifacts in the transmission signal. The instrumentation receiver should reduce the number of components, filters and design complexity associated with superheterodyne type receivers. The instrumentation receiver should further have a flexible design for receiving many different types of digitally modulated RF signals. In addition, the instrumentation receiver should facilitate the use of software based demodulation processes so that few hardware changes are required to adapt the design for different modulation standards.

SUMMARY OF THE INVENTION

Accordingly, an object of the present invention is an instrumentation receiver for generating a digitally modulated intermediate frequency (IF) signal from a digitally modulated radio frequency signal where the frequency of the IF signal is optimized for a certain signal relationship in the digitally modulated RF signal.

An additional object of the present invention is an instrumentation receiver for generating a digitally modulated IF signal from a VSB digital television signal.

A further object of the present invention is an instrumentation receiver generating a digitally modulated IF signal having a pilot signal at the IF frequency locked to the symbol frequency of the digital modulation signal modulating the IF signal.

Still a further object of the present invention is an instrumentation receiver generating a digitally modulated IF signal having a pilot signal at the IF frequency with the IF signal locked to symbol instants of the digital signal modulating IF signal.

An advantage of the instrumentation receiver of the present invention is generating digital values of the digitally modulated IF signal using an analog-to-digital converter sampled at an integer multiple of the symbol frequency of the digital modulation signal.

A further advantage of the instrumentation receiver of the present invention is generating digital values of the digitally modulated IF signal using an analog-to-digital converter sampled with a sample clock signal at an integer multiple of the symbol frequency of the digital modulation signal and having a clock transition coincident in phase with symbol instants of the digital symbols.

An additional advantage of the instrumentation receiver of the present invention is using the analog-to-digital converter for demodulating the digitally modulated IF signal to a baseband digital data signal.

The instrumentation receiver according to the present invention is suitable for receiving a digitally modulated radio frequency input signal having a pilot signal at the RF frequency and digital data generated at a symbol frequency. The instrumentation receiver includes a mixer receiving the digitally modulated radio frequency input signal and a local oscillator signal from a local oscillator that receives a control signal for adjusting the local oscillator signal to generate a digitally modulated intermediate frequency signal having the pilot signal at the intermediate frequency equal to an integer multiple of the symbol frequency where the integer multiple is equal to or greater than one with the intermediate frequency signal being coupled to a wide bandwidth low pass filter for removing mixer sum products and local oscillator feed through from the mixer. The local oscillator may be implemented using a phase locked loop having a phase detector receiving the intermediate frequency signal using as a reference signal a source with a frequency equal to an integer multiple of the digital data frequency where the integer multiple is equal to or greater than one. The phase detector generates a phase difference signal that is coupled to the local oscillator for controlling the frequency of the local oscillator signal to the mixer for locking the frequency of the pilot signal to that of the reference signal.

An analog-to-digital converter receives the intermediate frequency (IF) signal from the mixer and a sampling clock signal from a reference oscillator via an optional divider. It generates digital values representative of the intermediate frequency signal where the reference oscillator sampling clock signal is an integer multiple of the symbol frequency with the integer multiple being equal to or greater than one. The reference oscillator signal is further coupled to the phase detector via an optional divider for generating the reference signal used above to lock the pilot signal of the digitally modulated IF signal.

The local oscillator is implemented in the present invention with a first phase locked loop having a phase detector receiving the intermediate frequency signal and a reference signal equal to an integer multiple of the symbol frequency where the integer multiple is equal to or greater than one for generating a phase error signal for controlling a frequency synthesizer. The frequency synthesizer includes a second phase locked loop receiving control values for tuning the frequency synthesizer through a range of frequencies and a phase error signal for controlling the local oscillator signal to the mixer for locking the pilot signal to the reference signal.

The instrumentation receiver may further include a phase detection circuit coupled to receive the digital values representative of the IF signal for generating a control signal to the reference oscillator for locking in-phase a transition of the sampling clock signal to a symbol instant of the symbol data in the digitally modulated intermediate frequency signal.

A further embodiment of the instrumentation receiver according to the present invention includes a first signal path having an IF bandwidth with minimum group delay variation due to phase and amplitude error from amplifier gain stages and filtering, and a second signal path having a high dynamic range, narrow IF bandwidth having group delay variations due to phase and amplitude error from amplifier gain stages and narrow band filters. The first signal path is selectively coupled to the wide bandwidth low pass filter receiving the intermediate frequency signal from the mixer having the pilot signal at the intermediate frequency locked to a reference signal equal to an integer multiple of the symbol frequency where the integer multiple is equal to or greater than one with the local oscillator receiving a control signal for locking the pilot signal to the reference signal. The second signal path is selectively coupled to the wide bandwidth low pass filter with the local oscillator having a variable signal source for generating the control signal to the local oscillator for sweeping a range of frequencies in response to the control signal. An analog-to-digital converter is selectively coupled to the first and second signal paths for receiving the intermediate frequency signal and a sampling clock signal for generating digital values representative of the intermediate frequency signal from each signal channels. The sampling clock signal is an integer multiple of the symbol frequency where the integer multiple is equal to or greater than one.

The objects, advantages and novel features of the present invention are apparent from the following detailed description when read in conjunction with the appended claims and attached drawings.

DETAILED DESCRIPTION OF THE PREFERRED EMBODIMENT

Figure 2A:
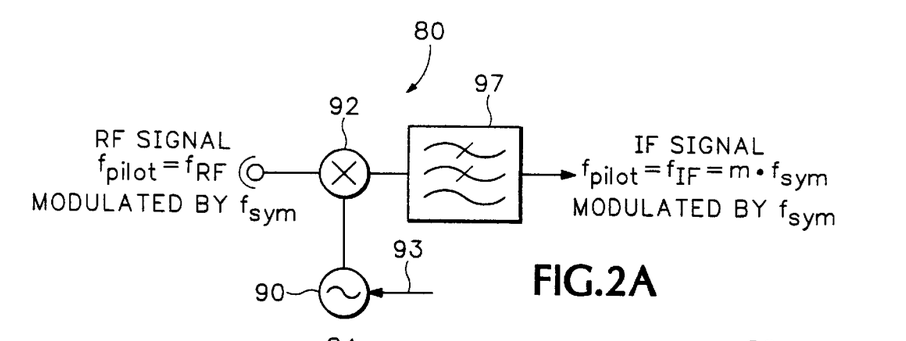
FIG. 2A is a simplified diagram of the instrumentation receiver according to the present invention.
Figure 2B:
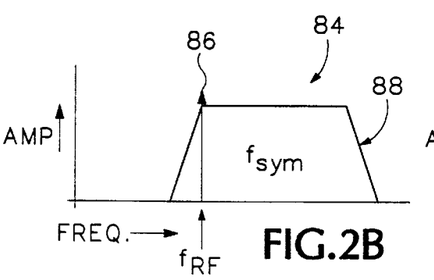
FIGS. 2B–2G are frequency spectrum representations of various digitally modulated RF input signals and corresponding digitally modulated IF output signals generated by the instrumentation receiver according to the present invention.
Figure 2C:
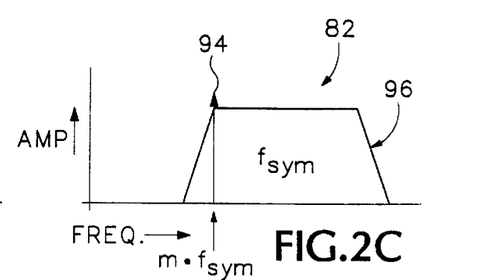
Figure 2D:
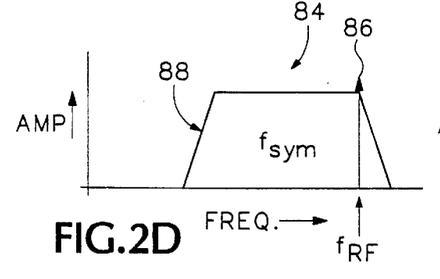
Figure 2E:
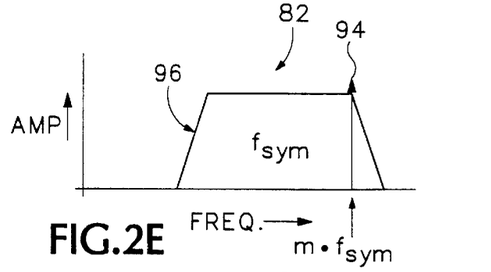
Figures 2F, 2G:
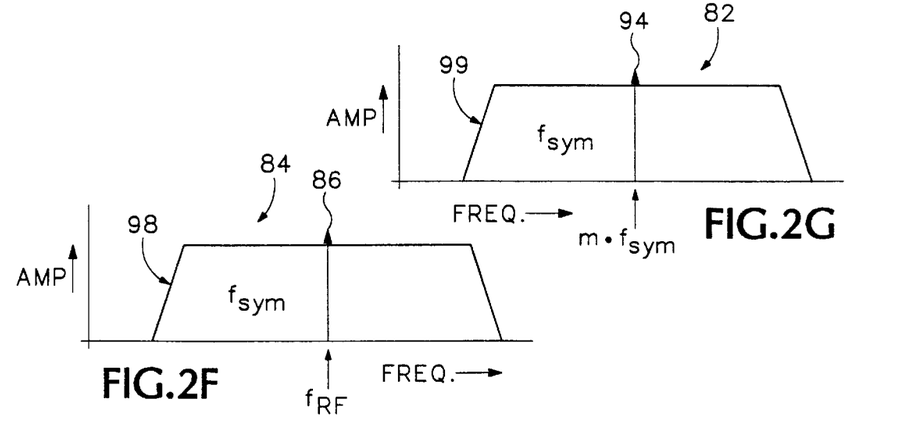

The instrumentation receiver 80 of the present invention, as represented in FIG. 2A, is a wide bandwidth, single conversion superheterodyne receiver for generating a digitally modulated intermediate frequency (IF) signal 82 from a digitally modulated RF input signal 84 as represented in FIGS. 2B through 2G. Characteristics of the digitally modulated RF signal 84 include a pilot signal $f_{pilot}$ 86 at the RF carrier frequency $f_{RF}$ and digital modulation with a symbol frequency or rate $f_{sym}$ modulating the RF carrier $f_{RF}$ as represented by the frequency spectrum 88. A local oscillator 90 couples an output signal to a mixer 92 that receives the digitally modulated RF signal 84. A control signal 93 adjusts the frequency of a local oscillator 90 to establish an IF signal $f_{IF}$ 82 relationship based on the IF pilot signal $f_{pilot}$ 94 and the symbol frequency $f_{sym}$. The IF pilot signal $f_{pilot}$ 94 in the digitally modulated IF signal $f_{IF}$ 82 is at the intermediate frequency and is equal to an integer multiple M of the symbol frequency $f_{sym}$ modulating the IF signal $f_{IF}$ as represented by the frequency spectrum 96 where the integer multiple is equal to or greater than one. The digitally modulated IF signal $f_{IF}$ 82 passes through a very wide bandwidth low pass filter 97 for removing the sum products of the mixer 92 and any local oscillator 90 signal feed through from the mixer 92. An example of such a digitally modulated RF signal is the physical layer modulation and transport design for digital television broadcasting. The physical layer modulation for the digital television broadcasting uses 4, 8 or 16 level trellis coding for generating symbol data at 10.76 Msymbols/sec $f_{sym}$ for modulating the RF carrier $f_{RF}$. A DC level is applied to each of the generated symbols that produces a small pilot signal $f_{pilot}$ at the carrier frequency. Other methods of introducing a pilot signal may be used in other formats. The below embodiments of the instrumentation receiver 80 will be described using an 8-VSB terrestrial digital television signal, but other digitally modulated RF signal S having the characteristics described above may be used with the present invention. This is representatively shown in FIGS. 2B through 2G with FIGS. 2B, 2D and 2F representing the digitally modulated RF signal and FIGS. 2C, 2E and 2C representing the digitally moduated IF signal $f_{IF}$ from the filter 97 in the instrumentation receiver 80. In FIGS. 2B and 2D, the digital modulation $f_{sym}$ on the VSB RF carrier $f_{RF}$ 84 produces a frequency spectrum 88 that occupies either the upper or lower sideband. The pilot signal $f_{pilot}$ 86 is shown at the carrier frequency $f_{RF}$. FIGS. 2C and 2E show the frequency spectrum 96 of a corresponding VSB IF signal $f_{IF}$ 82 with the pilot signal $f_{pilot}$ 94 at an integer multiple M of the symbol frequency $f_{sym}$. The frequency spectrum 96 of the VSB IF signal $f_{IF}$ may occupy either the upper or lower sideband with either of the upper or lower sideband signals being produced from either of the upper or lower sideband RF signals by positioning the frequency of the local oscillator 90 above or below the RF signal. In FIG. 2F, the digital modulation on the RF carrier $f_{RF}$ 84 produces a double sideband frequency spectrum 98. FIG. 2G shows the corresponding double sideband frequency spectrum 99 of the IF signal $f_{IF}$ 82 with the pilot signal $f_{pilot}$ 94 at an integer multiple M of the symbol frequency $f_{sym}$.

Figure 3:
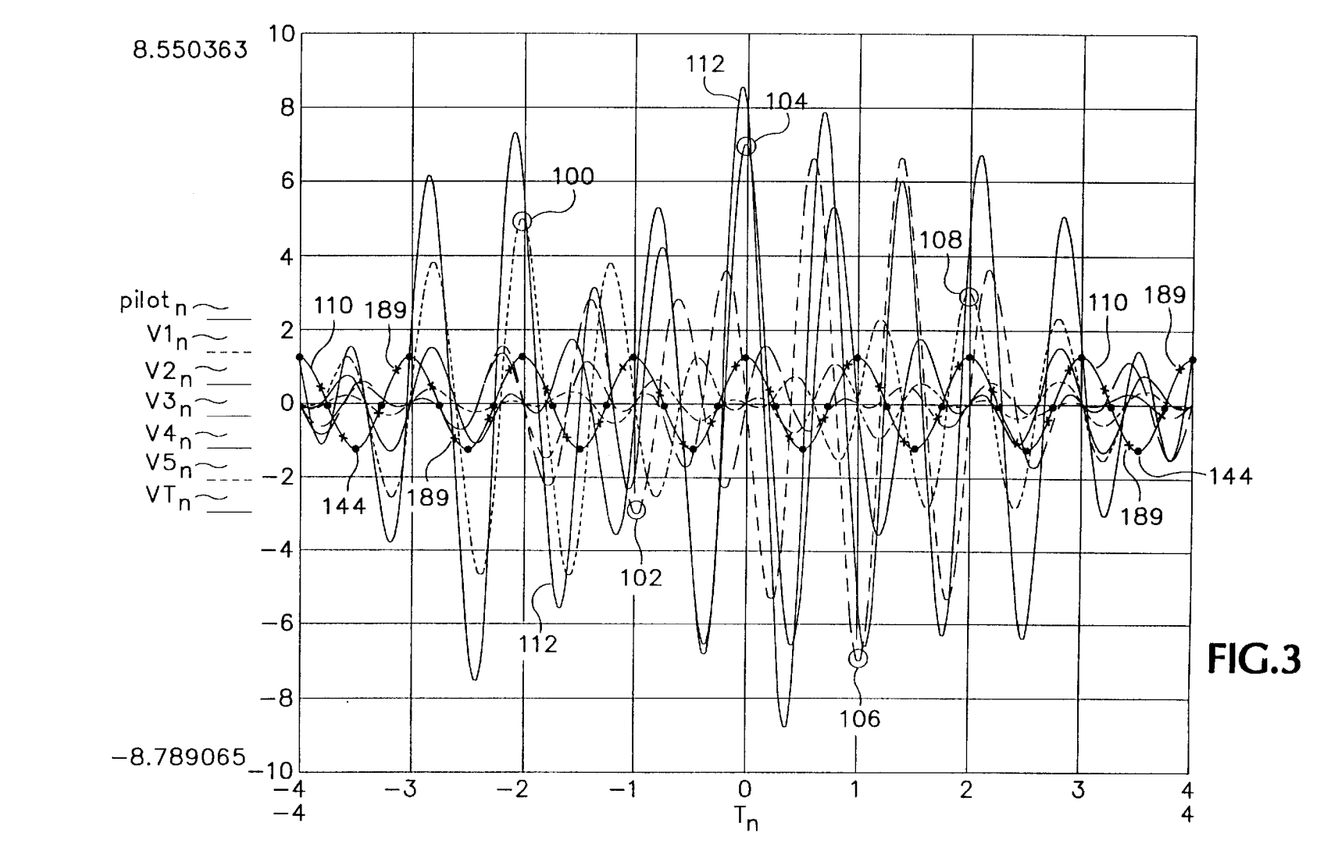
FIG. 3 is simplified representation of the 8-VSB IF signal generated by the instrumentation receiver according to the present invention

Referring to FIG. 3, there is shown a simplified representation of the 8-VSB IF signal generated by the instrumentation receiver 80. The 8-VSB signal is a trellis coded signal having eight odd integer symbol levels or values from −7 to +7 that are passed through a root raised cosine filter in the transmitter. The figure shows the impulse response of the raised cosine filter of five representative vestigial sideband filtered symbols 100, 102, 104, 106, and 108 along with a pilot signal 110 as part of the symbol data after being modulated by an RF carrier equal to the symbol frequency. A summation of the six signals is shown by waveform 112. The representative symbol data values are shown as being at the symbol levels. In actuality, because the pilot signal 110 is present with a 1.25 peak value and is the same frequency as the symbol period, the signal's amplitude at the symbol instant is offset by 1.25 units. This produces symbol levels of 6.25 for symbol 100, −2.75 for symbol 102, 8.25 for symbol 104, −6.76 for symbol 106 and 4.25 for symbol 108.

Figure 4:
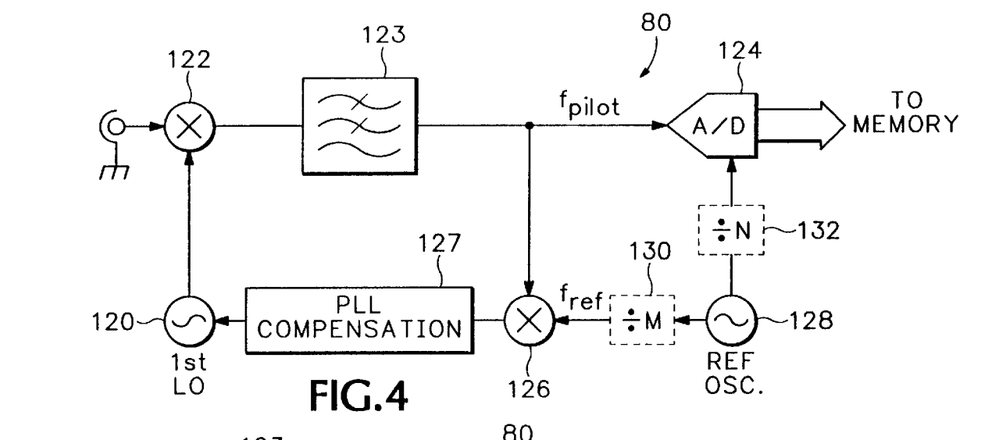
FIG. 4 is a representative block diagram of the instrumentation receiver according to the present invention.

Referring to FIG. 4, there is a representative block diagram of the instrumentation receiver 80 according to present invention. The instrumentation receiver 80 is a microprocessor controlled receiver that accepts an 8-VSB or other wideband digital signal having a pilot signal at the carrier frequency with digital symbol data generated at a symbol frequency and produces digital data values representative of the complex digitally modulated IF carrier. A 1st local oscillator (LO) 120 is tunable over a range of frequencies by a microprocessor (not shown) for generating an output signal that mixes with an incoming digitally modulated RF signal in mixer 122. A low pass filter 123, which is very wide with respect to the IF bandwidth used by the receiver, removes the sum products of the mixer 122 and any local oscillator 120 signal that may feed through (i.e. leak) the mixer 122. The output of low pass filter 123 is a digitally modulated intermediate frequency signal having the pilot signal $f_{pilot}$ at an integer multiple equal to or greater than one of the symbol frequency. The IF signal is coupled to the input of A/D converter 124 and a 2nd mixer 126, operating as a phase detector. The phase detector 126 receives a reference signal $f_{ref}$ from a reference oscillator 128 generating a reference oscillator signal having a frequency that is an integer multiple of the symbol frequency where the integer multiple is equal to or greater than one of the symbol frequency. A divide by M circuit 130 may be interposed between the reference oscillator 128 and the phase detector 126 for dividing down the reference signal when the reference signal is an integer multiple that is greater than one of the symbol frequency. The phase difference signal from the phase detector 126 passes through a Phase Locked Loop (PLL) compensation filter 127 and then controls the 1st LO 120 for phase locking the IF carrier to the reference signal. The PLL filter 127 has a bandwidth in the range of 2 KHz that narrows the bandwidth of the phase difference sufficiently so the loop can maintain lock with the wide bandwidth "noise like" digital IF signal applied. The output signal from the reference oscillator 128 is coupled to the clock input of the A/D converter 124 for sampling the IF signal at the input of the A/D converter 124. A divide by N circuit 132 may be interposed between the reference oscillator 128 and the A/D converter 124 clock input for dividing down the reference oscillator signal to a lower sampling rate when the reference oscillator signal is an integer multiple that is greater than one of the symbol frequency. The A/D converter 124 generates the digital data values representative of the IF signal which are stored in a memory (not shown) for further processing.

As previously stated, the pilot signal $f_{pilot}$ at the intermediate frequency is locked to an integer multiple of the symbol frequency $f_{sym}$ where the integer multiple is equal to or greater than one. The reference signal $f_{ref}$ to the phase detector 126 that controls the 1st LO 120 for locking the IF carrier and hence the pilot to the reference signal is provided by the reference oscillator 128 through the divider 130. The maximum frequency $f_{osc}$ of the reference oscillator based on the above equations is given by:

$$f_{osc_{max}} = f_{sym} \cdot M \cdot N \quad (1)$$

The relationship of the reference signal $f_{ref}$ to the pilot signal $f_{pilot}$ and the symbol frequency $f_{sym}$ is shown by the following equation.

$$f_{ref} = f_{pilot} = \frac{f_{sym} \cdot M \cdot N}{M} = f_{sym} \cdot N \quad (2)$$

The relationship between the clock input to the A/D converter 124 and the reference oscillator 128 frequency $f_{osc}$ through the divider 132 is:

$$f_{A/D} = \frac{f_{sym} \cdot M \cdot N}{N} = f_{sym} \cdot M \quad (3)$$

In certain instances common factors, such as 2, 3, 5 . . . , can be factored out to reduce the frequency of $f_{osc}$. For example, if the reference oscillator 128 frequency $f_{osc}$ is at four times the symbol frequency $f_{sym}$, the value of M in the divide by M circuit may be set to 1, 2 or 4 to produce a reference signal $f_{ref}$ to the phase detector 126 that is respectively 4 times the symbol frequency $f_{sym}$, 2 times the symbol frequency $f_{sym}$ or equal to the symbol frequency $f_{sym}$.

Figure 5:
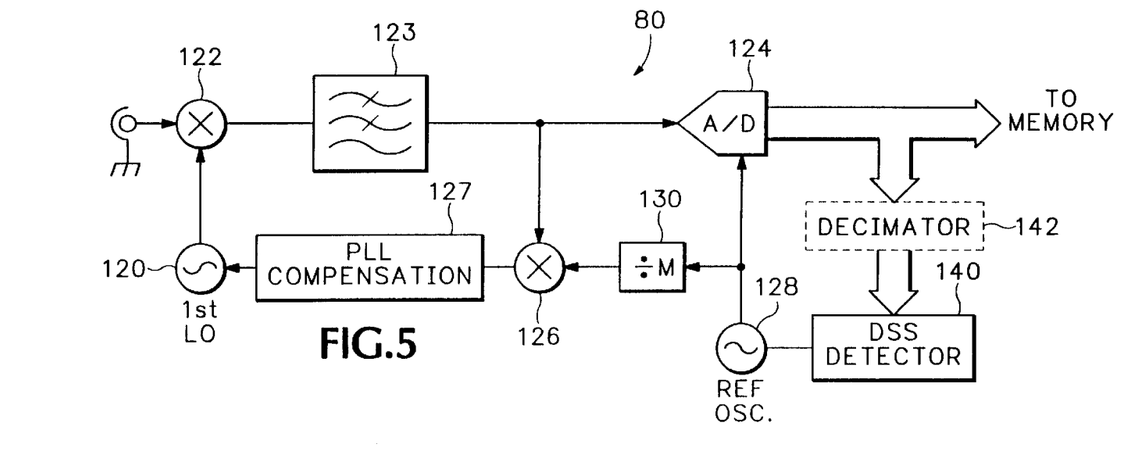
FIG. 5 is a representative block diagram of a further embodiment of the instrumentation receiver according to the present invention.

Referring to FIG. 5, there is a representative block diagram of a further embodiment of the instrumentation receiver 80 according to present invention. The 8-VSB digital television signal includes data segment sync pulses having a symbol pattern of +5, −5, −5, +5 that occur every 832 symbols. The digital data values representing the data segment sync pulses are used for generating a control signal for locking the reference oscillator to an integer multiple equal to or greater than one of the symbol frequency for time aligning transitions of the reference oscillator signal to the symbol data so that symbol instances occur at transitions of the reference oscillator signal. This is referred to as obtaining "Symbol Lock". Equivalent methods of obtaining a symbol lock exist and would be used when receiving digitally modulated RF signals based on their standards.

As in the previously described embodiment, 1st local oscillator (LO) 120 generates an output signal that mixes with a incoming digitally modulated RF signal in mixer 122. The IF signal from mixer 122 is filtered by low pass filter 123 for removing the sum products of the mixer 122 and any local oscillator 120 signal that may feed through the mixer 122. The IF signal from filter 123 is coupled to the input of the A/D converter 124 and the 2nd mixer 126, operating as a phase detector. The phase detector 126 receives the reference signal from a reference oscillator 128 via the divide by M circuit 130 for generating the phase difference signal from the phase detector 126. The phase difference signal from the phase detector 126 passes through a Phase Locked Loop (PLL) compensation filter 127 and then controls the 1st LO 120 for phase locking the IF carrier to the reference signal. The signal output from the reference oscillator 128 is shown as being directly coupled (i.e. N=1) to the clock input of the A/D converter 124 for sampling the IF signal at the input of the A/D converter 124. N could be any non-zero value. The digital data values at the output of the A/D converter 124 are coupled to a data segment sync detector 140 that generates a control signal from digital values representative of the data segment sync pulses for phase locking the reference oscillator to an integer multiple equal to or greater than one of the symbol frequency of the digital modulation data. The data segment sync may be implemented as an ASIC using the circuit described in U.S. Pat. No. 5,416,524 as previously described. The ASIC may also include a decimator 142 for decimating the digital data output from the A/D converter 124 if the response of the data sync detector is insufficient to handle the digital data sampled at greater than the symbol frequency $f_{sym}$. A matched filter having a frequency domain response matching a root raised cosine function may also be included in the ASIC if the sync detector is unable to detect the symbol sync sequences due to intersymbol interference. The data segment sync detector 140 may also be implemented in a VSB demodulator chip set, such as manufactured and sold by L. G. Semicon Co., Ltd. under Part No. GDC21D00, previously described in the "Background of the Invention". The data segment sync detector in the L. G. Semicon chip set accepts digital data at the symbol frequency of 10.76 Msymbols/sec. In an implementation of the instrumentation receiver 80 where the A/D converter 124 is being clocked by the reference oscillator 128 at greater than the symbol frequency, an optional decimator 142 decimates the digital data output of the A/D converter 124 to the symbol frequency for compatibility with the Zenith demodulator chip set.

Significant advantages are achieved by locking the reference oscillator 128 to an integer multiple equal to or greater than of the symbol frequency. Since the reference oscillator 128 provides the reference signal to the phase detector 126, the pilot signal in the IF signal becomes locked to an integer multiple equal to or greater than one of the symbol frequency. Because the pilot signal is locked to the symbol frequency or an integer multiple thereof, the sampling of the IF signal is time aligned so at least one sample instant occurs at each symbol instant. This is graphically shown in FIG. 3 as the points 144 on the pilot signal 110. With appropriate decimation of the digital signal, this causes the A/D converter 124 to act as both an A/D converter and as a demodulator for down converting the IF signal to baseband digital data values. A substantial reduction in circuitry is achieved with this design over current receiver designs.

Figure 6:
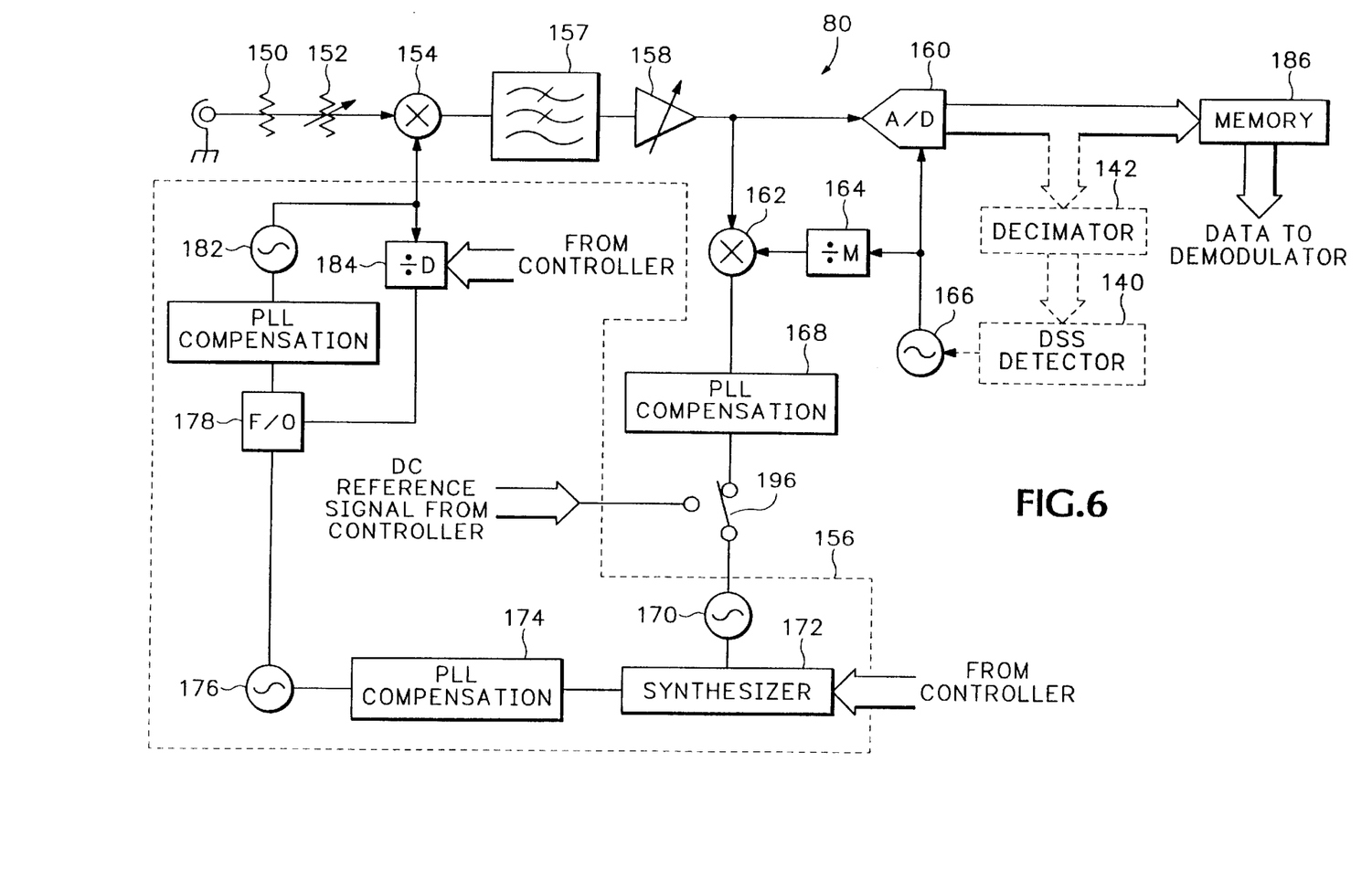
FIG. 6 is a more detailed block diagram of the instrumentation receiver according to the present invention.

Referring to FIG. 6, there is a more detailed block diagram of the preferred embodiment of the instrumentation receiver 80 according to the present invention. The instrumentation receiver 80 may be used for receiving a fairly high amplitude 8-VSB digital television signal derived directly from a directional coupler installed in the transmission line between a transmitter and its antenna. Because the directional couplers often have a fairly high output level, in the order of one to two watts, the 8-VSB signal entering the instrumentation receiver is applied to a 20 dB power attenuator 150. The power attenuator 150 provides an excellent match to the transmission line and to reduce the signal's amplitude to a level where it can be applied to a low power variable attenuator 152. The attenuated 8-VSB signal is applied to a mixer 154 that receives a local oscillator input signal from microprocessor controlled frequency synthesizer 156 functioning as a local oscillator for generating an intermediate frequency IF signal. The local oscillator 156 is tunable over a range of frequencies covering the frequency spectrum allocated to the terrestrial digital television standard. The IF frequency is chosen to place the pilot signal at a frequency equal to the symbol rate of the 8-VSB signal with the rest of the TV signal above the pilot frequency. The IF signal passes through a wide bandwidth filter 157 for removing from the IF channel any local oscillator 156 power feed through and sum frequency terms from the mixer 154. The low pass filtered IF signal is amplified in a number of gain stages as represented by the variable amplifier 158. The amplified IF signal is coupled to the input of A/D converter 160 and to a mixer 162 operating as a phase detector. The phase detector 162 receives a reference signal via a divide by M circuit 164 from a reference oscillator 166. In the preferred embodiment of the instrumentation receiver 80 of the present invention, the reference oscillator 166 generates an output signal that is four times the symbol frequency of the 8-VSB signal and N is equal to 1. The value of M in the divide by M circuit 164 is 4 for producing a reference signal at the mixer 162 that is equal to the symbol frequency. The phase detector 162 produces an error signal that is proportional to the phase difference between the IF signal and the reference signal. The error signal is processed by a Phase Locked Loop (PLL) compensation filter 168 and coupled through switch 196 to the frequency synthesizer 156. A DC reference signal is provided to the synthesizer 156 via the other switch 196 contact which will be described in greater detail below. The frequency synthesizer may be implemented in a number of differing circuit designs with the below described implementation being one of many. The criteria for any of the designs includes tuning through a range of frequencies compatible with the range of digitally modulated RF input signal frequencies to generate an IF signal frequency where the pilot signal in the IF signal is locked to an integer multiple of the symbol frequency. Further, the synthesizer needs to track changes in the IF signal frequency for maintaining the frequency synthesizer in a locked condition and the synthesizer needs to exhibit low phase noise so that excessive phase variations are not added to the signal under test.

The frequency synthesizer 156 includes a variable oscillator 170 receiving the error signal from the PLL compensation filter 168. The variable oscillator generates a variable output signal in the range of about 10 MHz that is coupled to a synthesizer 172, such as a SA8052A Synthesizer IC, manufactured and sold by Phillips, Inc. The synthesizer 172 receives digital values from the controller for setting the tuning levels for frequency synthesizer 156. The output of the synthesizer 172 is through a PLL compensation circuit 174 to a variable reference oscillator 176 operating in the range of 20 MHz. The output of the variable reference oscillator is coupled to a phase/frequency detector 178. The phase/frequency detector 178 also receives a divided down local oscillator signal from the local oscillator 182 via a variable divider 184. The local oscillator 182 has an frequency range in the range of about 162 MHz to 795 MHz, which can be implemented using dual oscillators with one operating in a lower frequency band and the other operating in a higher frequency band combined with frequency dividers with factors 2, 4, 8 . . . $2^k$. The value D in the variable divider 184 is set by the controller for dividing the local oscillator signal to the range of the variable reference oscillator signal. The frequency/phase detector 178 produces an error signal that is proportional to the phase difference between the divided down local oscillator signal and the variable reference oscillator signal. The error signal is processed by a PLL compensation filter 180 for producing a control signal to the local oscillator 182 that varies the local oscillator signal to the mixer 154 to lock the IF signal to the reference signal.

The reference oscillator signal from the reference oscillator 166 is coupled to the clock input of the A/D converter 160 for generating sampling instances of the IF signal at the A/D converter 160 input. The sampling frequency is four times the symbol rate. The outputs of the A/D converter 160 are digital data values representing the IF signal which are stored in memory 186 for further processing. The reference oscillator 166, as shown, is not locked to the symbol data frequency which may produce sampling instants that are not at the symbol instants as shown by the points labeled 189 on the pilot signal 110 in FIG. 3. The digital data values representing the IF signal would require further demodulator processing to align the symbol instants with the sampling instants. The optional decimator 142 and data segment sync detector 140, previously described, locks the reference oscillator 166 to the symbol frequency for generating sampling instants at the symbol instants.

Figure 7:
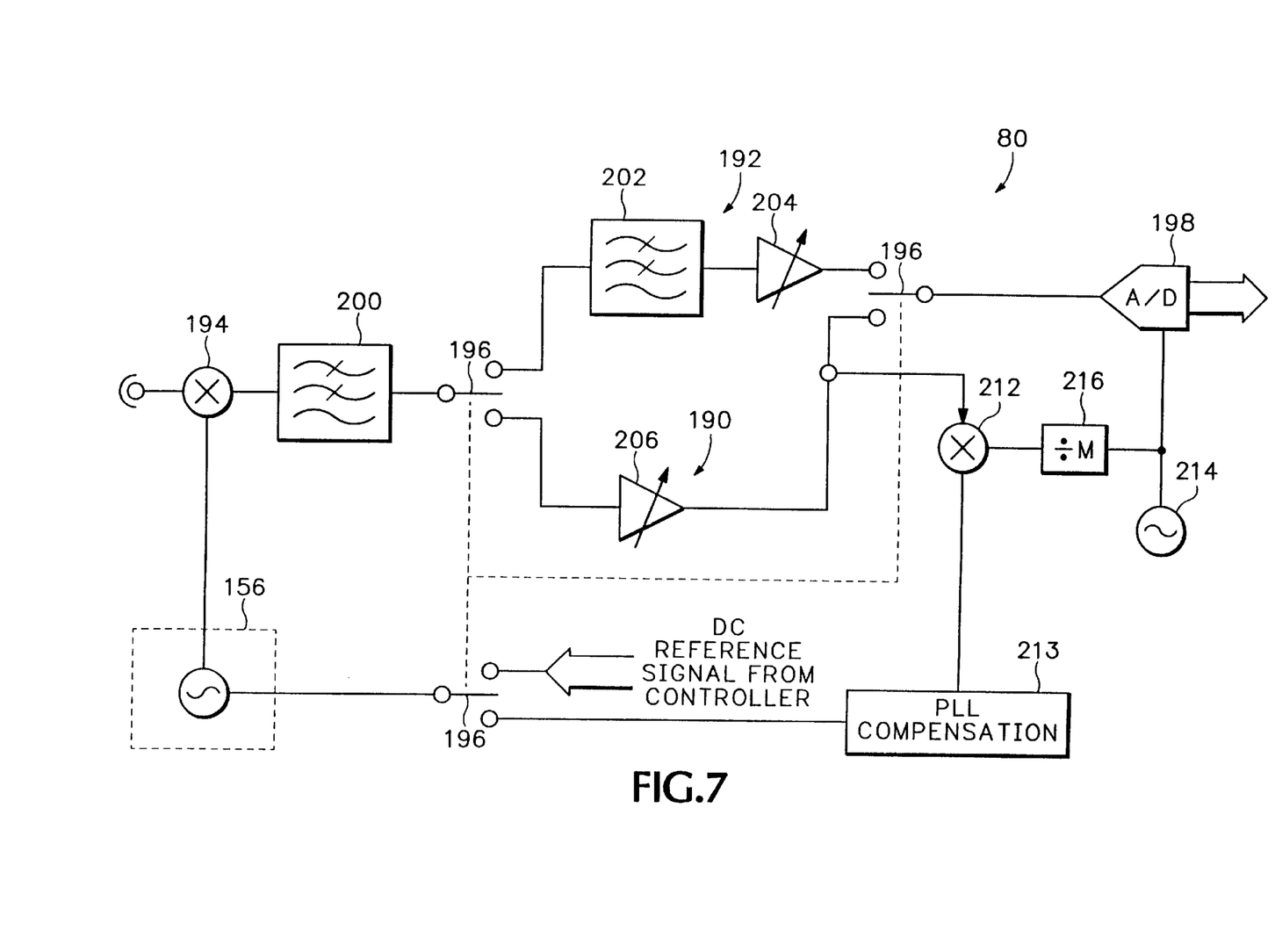
FIG. 7 is a representative block diagram of still a further embodiment of the instrumentation receiver according to the present invention.

Referring to FIG. 7, there is shown a further embodiment of the instrumentation receiver 80 according to the present invention. The instrumentation receiver 80 includes a minimally distorted wideband signal path 190 for accurately demodulating digitally modulated signals and a high dynamic range, narrow band signal path 192 for traditional, spectrum analyzer-like measurements. Both signal paths 190 and 192 selectively receive intermediate frequency signals from a wide bandwidth low pass filter 200 via one of a ganged set of switches 196 and selectively couple their respective outputs to an A/D converter 198 through another of the ganged switches 196. The wide filter 200 on the output of the mixer 194 removes local oscillator power and mixer sum products from the IF channels 190 and 192. The high dynamic range, narrow band signal path 192 includes a number of filter elements, such as a 30 kHz narrow band filter, as represented by filter block 202 and amplifier stages, as represented by variable amplifier 204. The amplifier stages 204 have gain control elements for generating a high amplitude signal with minimal noise. The minimally distorted wideband signal path 190 includes only gain stages, as represent by variable amplifier 206, with no narrow band filters for producing minimal receiver generated linear distortions.

With the high dynamic range, narrow signal path 192 in the IF signal path, the synthesizer 156 receives the reference signal from the controller via ganged switch 196. The reference signal from the controller provides a constant DC output signal to the synthesizer 172. The controller also provides digital values to the synthesizer 172 for sweeping the oscillator 182 through a range of frequencies for performing traditional spectrum analysis measurements. With the minimally distorted wideband signal path 190 in the IF channels, the mixer 212 receives the IF signal and a reference signal from a reference oscillator 214 via a divide by M circuit 216. The reference oscillator 214 generates a reference oscillator signal having a frequency that is an integer multiple equal to or greater than one of the symbol frequency. The divide by M circuit 212 is used for dividing down the reference oscillator signal when the reference oscillator signal is an integer multiple that is greater than one of the symbol frequency. As previously described, the reference oscillator generates a reference oscillator output signal that is four times the symbol frequency and the reference signal to the mixer 212 is at the symbol frequency. For this implementation, the value of M is set to four and N is set to 1. The mixer 212 generates a phase difference signal that is processed by a Phase Locked Loop (PLL) compensation filter 213 and coupled through switch 196 to the frequency synthesizer 156 for controlling the local oscillator signal to the mixer 194 for locking the pilot signal to the reference signal.

The reference oscillator 214 output signal is also coupled to the clock input of the A/D converter 198 for converting the IF signal coupled through the minimally distorted wideband signal path 190 and the high dynamic range, narrow band signal path 192 to digital data values representative of the IF signal through each of the paths. The digital data values are stored in a memory for further processing.

An instrumentation receiver has been described the accepts digitally modulated RF input signal and generates a digitally modulated intermediate frequency (IF) signal having a pilot signal at the IF frequency that is an integer multiple of the symbol frequency where the integer multiple is equal to or greater than one. The instrumentation receiver includes a mixer receiving the digitally modulated radio frequency input signal and a local oscillator signal from a local oscillator that receives a control signal for adjusting a local oscillator signal to convert the digitally modulated input signal to a digitally modulated intermediate frequency signal having the pilot signal at the intermediate frequency equal to an integer multiple of the symbol frequency of the digital modulation where the integer multiple is equal to or greater than one. The local oscillator contains a phase locked loop having a phase detector receiving the intermediate frequency signal and a reference signal equal to an integer multiple of the symbol frequency where the integer multiple is equal to or greater than one. The phase detector generates a phase difference signal that is coupled to the local oscillator for controlling the local oscillator signal to the mixer for locking the pilot signal to the reference signal.

An analog-to-digital converter digitizes the analog IF signal to digital data values representative of the digitally modulated IF signal. A reference oscillator generates an output signal that is an integer multiple equal to or greater than one of the symbol frequency for clocking the A/D converter and generating the reference signal to the phase detector. The digital data values may be coupled to a data segment sync detector for generating a control signal for locking the reference generator to the symbol frequency. An alternative high dynamic range, narrow band signal path may be included with the minimally distorted wideband signal path for providing an IF signal for performing spectrum analyzer type measurements.

It will be obvious to those having skill in the art that many changes may be made to the details of the above-described embodiments of this invention without departing from the underlying principles thereof Further, it will be obvious to those having skill in the art that even though the description of the preferred embodiment of the invention made extensive use of the 8-VSB system adopted by the FCC to illustrate its function, that this invention is suitable for any digitally modulated signal incorporating a pilot tone at the RF carrier frequency. The scope of the present invention should, therefore, be determined only by the following claims.

What is claimed is:

1. An instrumentation receiver for generating a digitally modulated intermediate frequency signal from a digitally modulated radio frequency input signal, the digitally modulated radio frequency input signal being modulated by digital data generated at a symbol frequency and having a pilot signal coherent with the radio frequency carrier, comprising:

a mixer having as inputs the digitally modulated radio frequency input signal and a local oscillator signal and having as an output the digitally modulated intermediate frequency signal;

a local oscillator having as an input a control signal and having as an output the local oscillator signal, the control signal adjusting the frequency of the local oscillator signal such that in the digitally modulated intermediate frequency signal the pilot signal is coherent with the intermediate frequency carrier signal and equal to an integer multiple of the symbol frequency where the integer multiple is equal to or greater than one; and a wide bandwidth low pass filter having as an input the digitally modulated intermediate frequency signal from the mixer and having as an output the digitally modulated intermediate frequency signal with mixer sum products and local oscillator feed through from the mixer removed.

2. The instrumentation receiver as recited in claim 1 further comprising a phase detector having as inputs the digitally modulated intermediate frequency signal from the wide bandwidth low pass filter and a reference signal equal to an integer multiple of the symbol frequency where the integer multiple is equal to or greater than one and having as an output a phase difference signal coupled to the local oscillator as the control signal for locking the pilot signal to the reference signal.

3. The instrumentation receiver as recited in claim 2 further comprising an analog-to-digital converter having as inputs the digitally modulated intermediate frequency signal from the wide bandwidth low pass filter and a sampling clock signal and having as an output digital values representative of the digitally modulated intermediate frequency signal wherein the sampling clock signal is an integer multiple of the symbol frequency where the integer multiple is equal to or greater than one.

4. The instrumentation receiver as recited in claim 3 further comprising a reference oscillator having as an output a reference oscillator signal that is an integer multiple equal to or greater than one of the symbol frequency from which the reference and sampling clock signals are derived.

5. The instrumentation receiver as recited in claim 4 further comprising a divider with an integer divide ratio having as an input the reference oscillator signal and having as an output the reference signal.

6. The instrumentation receiver as recited in claim 4 further comprising first and second dividers with respective integer divided ratios, each divider having as an input the reference oscillator signal with the first divider having as an output the reference signal and the second divider having as an output the sampling clock signal.

7. The instrumentation receiver as recited in claim 1 further comprising:
   a phase detector having as inputs the digitally modulated intermediate frequency from the wide bandwidth low pass filter and a reference signal equal to an integer multiple of the symbol frequency where the integer multiple is equal to or greater than one and having as an output a phase error signal; and
   a frequency synthesizer having as inputs control values for tuning the frequency synthesizer through a range of frequencies and the phase error signal and having as an output the control signal for controlling the local oscillator signal to the mixer for locking the pilot signal to the reference signal.

8. The instrumentation receiver as recited in claim 4 further comprising a phase detection circuit having as an input the digital values from the analog-to-digital converter and having as an output a reference control signal coupled to the reference oscillator for locking in phase a transition of the sampling clock signal to a symbol instant of the digital data in the digitally modulated intermediate frequency signal.

9. The instrumentation receiver as recited in claim 1 further comprising:
   a wideband signal path with an IF bandwidth having minimum group delay variation due to phase and amplitude error from amplifier gain stages and filtering, the wideband signal path having an input selectively coupled to the output of wide bandwidth low pass filter and having as an output an amplified version of the digitally modulated intermediate frequency signal with minimal receiver generated linear distortions; and
   a narrowband signal path with a high dynamic range, narrow IF bandwidth having group delay variations due to phase and amplitude error from amplifier gain stages and narrow band filters, the narrowband signal path having an input selectively coupled to the output of the wide bandwidth low pass filter and having as an output a narrowband version of the digitally modulated intermediate frequency signal with the local oscillator having a variable signal source as the control signal for sweeping a range of frequencies when the narrowband signal path is selected.

10. The instrumentation receiver as recited in claim 9 further comprising an analog-to-digital converter having an input selectively coupled to the output of either the wideband or the narrowband signal path and having as a further input a sampling clock signal for generating digital values representative of the digitally modulated intermediate frequency signal received from the selected signal path wherein the sampling clock signal is an integer multiple of the symbol frequency where the integer multiple is equal to or greater than one.

11. The instrumentation receiver as recited in claim 10 wherein the wideband signal path further comprises a reference oscillator having as an output a reference oscillator signal that is an integer multiple equal to or greater than one of the symbol frequency from which the control signal and sampling clock are derived, the control signal derived from the reference oscillator signal being applied to the local oscillator when the wideband signal path is selected.

12. The instrumentation receiver as recited in claim 11 further comprising:
   a divider with an integer divide ratio having as an input the reference oscillator signal and having as an output a reference signal having a frequency that is an integer multiple of the symbol frequency where the integer multiple is equal to or greater than one; and
   a phase detector having as inputs the reference signal and the output from the wideband signal path and having as an output a phase control signal coupled to the local oscillator as the control signal when the wideband signal path is selected.

* * * * *